United States Patent Office 3,008,199
Patented Nov. 14, 1961

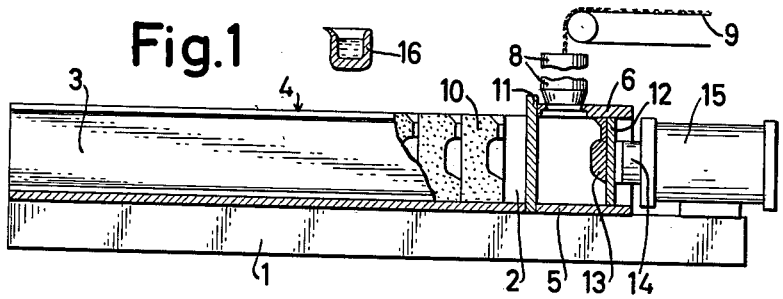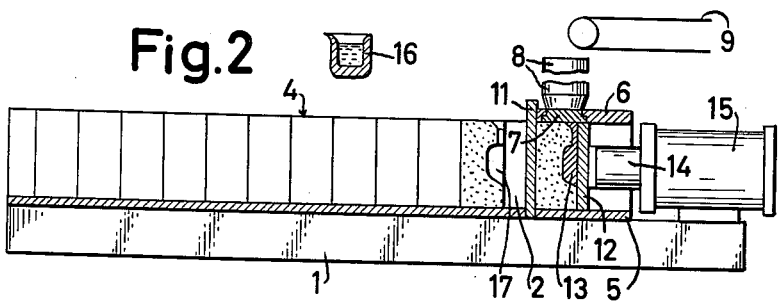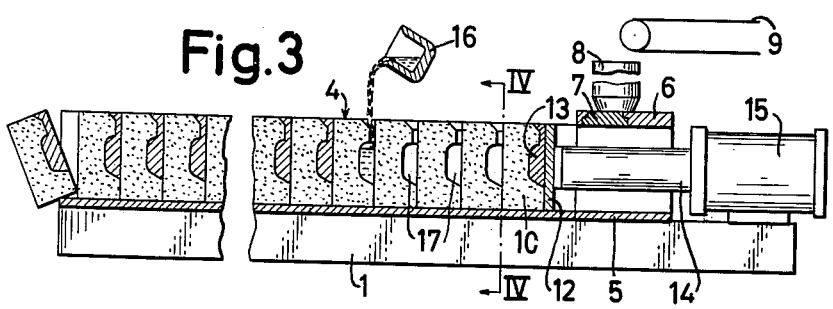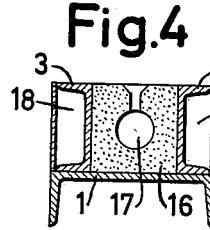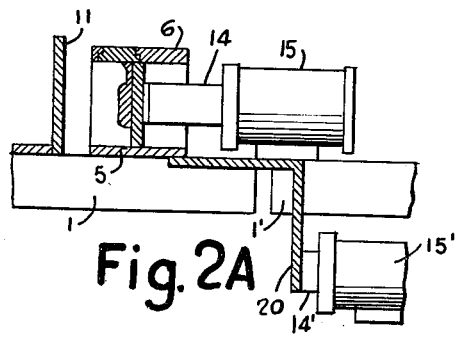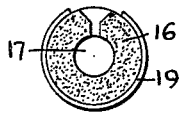
INVENTORS
VAGN A. JEPPESON

3,008,199
METHOD OF PRODUCING CASTING MOLDS AND A PLANT FOR CARRYING OUT THE SAID METHOD
Vagn Aage Jeppesen, 10 Ulvemoseve J, Rungsted, Denmark
Filed Aug. 19, 1958, Ser. No. 756,015
Claims priority, application Denmark Aug. 30, 1957
7 Claims. (Cl. 22—26)

The present invention relates to a method of producing so-called stacked molds i.e. casting molds of molding sand or some similarly moldable material and consisting of uniform mold parts assembled with each other and presenting mold faces for forming one or more casting cavities at each joint in the mold.

The main object of the present invention is to simplify and reduce the costs of the work in foundries, particularly by an especially rational organization of the production and utilization of the casting molds with a minimum contribution of manual labour as well as mechanical equipment.

According to the invention the mold parts are produced successively between a pair of opposed pattern boards in a molding chamber which is in connection with a guiding path, onto which the mold parts, after having been separated from the pattern board adjacent to the guiding path, are pushed by a motion transmitted from the other pattern board, so as to be successively assembled to form a mold ready for pouring. It must be pointed out that the term "pattern board" in this connection is meant to comprise any element serving for forming a mold face in the mold parts and thus for example comprises a simple flat plate which may be used when one of the mold parts shall comprise a flat or plane mold face.

By this method both the production and the assemblage of the mold parts can be effected exceedingly quickly and possibly quite automatically, i.e. without the use of manual work, it being possible by a simple movement of displacement to remove the mold parts produced from the molding chamber and at once put them in place in or on the guiding path. The individual mold parts may be produced without using frames or mold boxes so that the problem of the transport of the latter is completely eliminated. The mold boxes and their associated guiding and clamping means may in a way be said to be substituted by the guiding path which can both ensure the correct assemblage of the mold parts and, e.g. solely by friction against the latter, keep the mold assembled.

It will be understood that in the method according to the invention, one of the pattern boards functions as an anvil member, and therefore only a single element is to be removed from the molding chamber before free passage is obtained from the latter to the guiding path. For the same reason the mold part produced should, before being pushed out from the molding chamber, be separated from only one element so that the motion or displacement of the mold part is simplified. It is a further advantage that the displacement of the mold parts out of the chamber and onto the guiding path is effected by a motion of the other pattern board, the latter bearing with its full face against the mold part and thereby practically speaking completely eliminates damage to the latter due to bending stresses which otherwise might occur during the transport. A third and very important advantage of the method according to the invention is that the insertion of cores in the mold may be effected concurrently with the mold part production proper and therefore need not delay the latter. This is due to the fact that the cores may be inserted in the "open" end of the stack or string of mold parts already formed, i.e. in time with but without any direct influence upon the production of the mold parts. Not the least this latter fact contributes to the attainment, through the method according to the invention, of a rate of production which by far exceeds what has hitherto been possible.

When the mold parts are produced in a vertical position, i.e. in a molding chamber with a substantially horizontal axial direction, the molding material will, if it slides down into the molding chamber actuated solely by gravity, not always be able to deposit closely to the faces of the pattern, in particular not to the downwards-facing portions thereof. Cavities may therefore be formed, and a mold part pressed after such a filling will usually be impractical due to too soft mold edges. According to the invention it is therefore preferred that the molding material is filled into the molding chamber by being blown in by compressed air. Hereby a complete filling out of the molding chamber is attained, and furthermore a pre-compression of the mold part is attained whereby the distribution of the hardness in the finally compressed mold part becomes very uniform. Still further, the blowing in by means of compressed air gives a practically speaking instantaneous filling of the chamber.

For the stabilization or strengthening of the mold parts there may during or after the filling of the molding material into the molding chamber be added a hardening agent, e.g. carbon dioxide.

The invention furthermore relates to a plant for carrying out the method explained above and consisting of a mold part production apparatus with a cylindrical molding chamber, and a guiding path for receiving the mold parts from the molding chamber. According to the invention this plant is characterised in that the end walls of the molding chamber are formed by two pattern boards, one of which is displaceable through the chamber in the axial direction of the latter, while the other is movable between a position, in which it closes the end of the chamber facing the guiding path, and an inactive position outside the periphery of the chamber. It appears from what has already been explained that such a plant will be able to operate exceeding quickly in the case of a successive production and assemblage of an optional number of mold parts, the speed being i.e. due to the fact that the work with transport and assemblage of the mold parts is reduced to a minimum and can be performed without any manual interference whatever. It should be pointed out that the word "cylindrical" is in this connection used in its widest sense. The wall of the molding chamber will usually be prismatical and have a rectangular cross section.

According to the invention the former pattern board is advantageously displaceable such a distance past the normal position of the other pattern board that after the molding chamber has been re-closed there will be sufficient room left for inserting cores, if any, in the freely exposed casting cavity in the last one of the mold parts transferred to the guiding path. Various advantages of this arrangement will appear direct from the above explanations.

When the axis of the molding chamber is substantially horizontal, the lower part of the wall of the molding chamber may advantageously be integral with the lower wall of the guiding path. Hereby a particularly smooth transition from the mold part production apparatus to the guiding path is obtained, so that the risk of damage to the mold parts during their removal is reduced to a minimum.

The invention is more fully described in the following with reference to the accompanying drawing, in which FIGS. 1, 2, 2A and 3 illustrate diagrammatical longitudinal sections through a mold production and casting plant according to the invention in different situations during its operation, FIG. 4 a cross section on line IV—IV in FIG. 3, and FIG. 5 a corresponding cross section in a modified embodiment of the plant.

In the drawing, 1 designates a supporting frame consisting of a horizontal channel section which is mounted web upwards, see FIG. 4. On the upper side of the frame 1 and along each of the longitudinal edges thereof is mounted channel sections 2 and 3, respectively, with their webs facing each other. The said two channel sections 2 and 3 may be transversely adjustable in relation to the frame 1.

The three channel sections 1, 2, and 3 together form a horizontal guiding path 4, which is situated in line with a mold part producing apparatus comprising a molding chamber 5. This chamber 5 is movable towards and away from the guide 4, e.g. by means of a hydraulic cylinder 15', FIG. 2A, operating through connecting means 20 to also move ram 15. The top wall 6 of the chamber contains an opening, through which the chamber may receive molding sand supplied on a conveyor 9 and introduced into the chamber by means of a pressure air operated blowing apparatus 8, the details of which are omitted on the drawing. Between the molding chamber 5 and the channel sections 2 and 3 of the guide 4 is inserted a pattern board 11 in the form of a plane plate which forms one end wall of the molding chamber 5. The other end wall thereof is formed by a plane plate 12 carrying a pattern 13. The plate 12 is mounted on the spindle 14 of a hydraulic ram or jack 15 supported by the frame 1.

16 designates a casting ladle mounted above the guiding path 4.

In FIG. 1 the pattern board 11 is slid into its place, the other pattern board 12, 13 is in a withdrawn position, and the supply of molding sand may take place. When the chamber 5 has been completely filled, a slide gate 7, FIG. 2, is brought into its closing position to obstruct the opening in the wall 6, and the pattern board 12, 13 is pressed forwards to compress the molding sand in the molding chamber 5.

After the termination of the compression, FIG. 2, and after the mold part produced has possibly been stabilized by the addition of a hardening agent, if desired, the pressure on the pattern board 12, 13 is relieved, and the molding chamber 5 together with the mold part 10 produced therein is withdrawn from the opposite pattern board 11, see FIG. 2A. This pattern board may then be removed so that the molding chamber 5 becomes open towards the guiding path 4. Thereupon the molding chamber 5 is moved forwards until it abuts on the guide 4, and the pattern board 12, 13 is displaced forwards through the molding chamber 5, FIG. 3, in order to push the mold part 10 produced out onto the guiding path 4, where this mold part 10 together with the previously produced mold parts forms a stack or string of casting molds. For each mold part 10 added the stack of casting molds is advanced one step or interval by the pressure exerted through the pattern board 12, 13.

From the position in FIG. 3 the pattern board 12, 13 and the molding chamber 5 are returned to the positions shown in FIG. 1, the other pattern board 11 is once more slid into the space now left between the guide 4 and the chamber 5, and the slide gate 7 in the top wall 6 of the molding chamber is opened, whereupon molding sand may again be supplied for another mold part.

In time with this production of mold parts, the casting ladle 16 can be maneuvered in such a way that the successive mold cavities 17 in the stack of casting molds are filled with casting material. From the front, on the drawing the left, end of the guiding path 4 the mold parts with the casting can fall directly downwardly onto a knock out grid, from which the molding sand via a regeneration plant may be returned to the belt conveyor 9 or other sand discharge apparatus, while the casting produced passes on to be cleaned.

FIG. 4 shows that the side walls 2 and 3 of the guiding path may contain cooling spaces 18 through which water or some other cooling agent can flow to speed up the cooling along the stretch between the pouring place and the knocking-out place. Along the same stretch or part of the latter the stack or string of casting molds may be weight-loaded, or the guiding path 4 may have a more or less closed cross section, e.g. as indicated in FIG. 5, where the guiding path is formed by a tube 19 which is slit in its top side.

The pouring need not be performed in time with the production of the mold parts, as for example under certain conditions it may be more practical first to produce a stack or string of casting molds consisting of a certain number of mold parts, and next pour the total number of mold cavities in this stack of casting molds before the production of another stack of casting molds is commenced. A plant which is to work according to this method may comprise several separate guiding paths which may be connected to a common mold part production apparatus, so that the production of a stack of casting molds in one guiding path can be performed concurrently with the pouring in a stack of casting molds on another guiding path.

I claim:

1. A method of producing casting molds of the type comprising a stack of generally similar mold parts defining at least one casting cavity at each joint between adjacent mold parts, comprising the steps of introducing a quantity of molding material into a mold part forming chamber comprising a peripheral wall, a first end wall formed by a pattern board, and a second end wall formed by another pattern board spaced from the first pattern board and slidably received within said peripheral wall, compressing said quantity of molding material by pressing said second end wall towards said first end wall, relieving the pressure exerted via said second end wall and separating the compressed quantity of material from said first end wall by a relative displacement between said chamber and said first end wall in the line of movement of the compression, opening said chamber towards a mold part receiving guiding path aligned with said chamber by removing said first end wall transversely from said chamber, and shifting the compressed quantity of molding material from said chamber towards said guiding path by displacing said second end wall past the initial position of said first end wall.

2. A method of producing casting molds of the type comprising a stack of generally similar mold parts defining at least one casting cavity at each joint between adjacent mold parts, comprising the steps of introducing a quantity of molding material into a mold part forming chamber comprising a peripheral wall, a first end wall formed by a pattern board, and a second end wall formed by another pattern board spaced from the first pattern board and slidably received within said peripheral wall, compressing said quantity of molding material by pressing said second end wall towards said first end wall, separating the compressed quantity of material from said first end wall by relieving the pressure exerted via said second end wall and displacing said peripheral wall together with said quantity of material compressed therein and said second end wall away from said first end wall over a distance exceeding the depth of the pattern thereof, opening said chamber towards a mold part receiving guiding path by withdrawing said first end wall from said chamber in a transverse direction relatively to the compression axis of said chamber, and shifting the compressed quantity of molding material from said chamber towards said guiding path by displacing said second end wall past the initial position of said first end wall.

3. A method of producing casting molds of the type comprising a stack of generally similar mold parts defining at least one casting cavity at each joint between adjacent mold parts, comprising the steps of introducing by means of pressurized air a quantity of molding material into a mold part forming chamber comprising a peripheral wall, a first end wall formed by a pattern board, and a second end wall formed by another pattern board spaced from the first pattern board and slidably received within said peripheral wall, further compressing said quantity of molding material by pressing said second end wall towards said first end wall, separating the compressed quantity of material from said first end wall by relieving the pressure exerted via said second end wall, displacing said peripheral wall together with said quantity of material compressed therein and said second end wall away from said first end wall over a distance exceeding the depth of the pattern thereof, opening said chamber towards a mold part receiving guiding path by withdrawing said first end wall from said chamber in a transverse direction relatively to the compression axis of said chamber, and shifting the compressed quantity of molding material from said chamber towards said guiding path by displacing said second end wall past the initial position of said first end wall.

4. A plant for producing casting molds of the stack mold type, comprising a mold part forming apparatus and a mold part receiving apparatus having a mold part guiding and supporting path, said mold part forming apparatus including a mold part forming chamber arranged in line with said mold part guiding and supporting path and having a peripheral wall path axis along an axis coincidental with respect to said path axis, a first end wall forming pattern board adjacent said mold part receiving apparatus, and a second end wall forming pattern board remote therefrom, said first pattern board being displaceable between an operative position in which it closes the end of said chamber towards said mold part receiving apparatus, and an inoperative position outside the periphery of said chamber, and said second pattern board being displaceable through said chamber in the direction of the mold part guiding path towards and at least slightly past said operative position of said first pattern board when this pattern board is in said inoperative position, said mold part forming apparatus further comprising means for admitting molding material to said chamber, means for displacing said second pattern board towards said first pattern board in the operative position thereof for compressing the admitted molding material to form a mold part, means for separating said mold part and said first pattern board by relative movement of the pattern board and the mold chamber in the line of movement of the compression, and means for imparting a further displacement to said second pattern board towards said mold part receiving apparatus when said first pattern board is in said inoperative position.

5. Apparatus for forming horizontally stacked molds comprising a molding chamber in which the molds are formed, a delivery chute adjacent to and in alignment with said chamber for supporting and guiding molds for horizontal movement therethrough, means forming the top wall of said chamber for introducing a mold forming material into said chamber, a pattern plate forming one wall of said chamber adjacent said chute and movable to an inoperative position to communicate said chamber with said chute, means for moving said molding chamber away from said chute when the pattern plate is in its operative position and toward said chute when said pattern plate is moved to inoperative position for closing the space between the chamber and the chute previously occupied by the pattern plate, pressure applying means forming another wall of said chamber opposite said one wall for compressing the mold forming material into a mold and for discharging a finished mold from said chamber and into said chute after operation of said chamber moving means.

6. A method of producing casting molds of the type comprising a stack of generally similar mold parts defining at least one casting cavity at each joint between adjacent mold parts, comprising the steps of introducing a quantity of molding material into a mold part forming chamber, compressing said quantity of molding material between a pair of pattern boards which form opposite end walls of said chamber, displacing said chamber and one pattern board away from the other pattern board, opening said chamber towards a mold part receiving guiding path in alignment with said chamber by removing the other pattern board adjacent said path from said chamber in a direction transverse to said chamber, discharging a mold part thus formed from the chamber by displacing said one pattern board inside said chamber towards said guiding path to a position past the initial position of the removed pattern board.

7. A method of producing casting molds of the type comprising a stack of generally similar mold parts defining at least one casting cavity at each joint between adjacent mold parts, comprising the steps of introducing, by means of pressurized air, a quantity of molding material into a mold part forming chamber, compressing said molding material between a pair of pattern boards which form opposite end walls of said chamber, opening said chamber towards a mold part receiving guiding path in alignment with said chamber by removing the pattern board adjacent said path from said chamber in a direction transverse to the chamber, releasing the pressure on said other pattern boards discharging a mold part thus formed from the chamber by displacing said other pattern board inside said chamber towards said guiding path to a position past the initial position of the removed pattern board and simultaneously, by movement of the mold part being discharged from said chamber, moving stacked molds in said guiding path past a casting device, and pouring metal from said casting device between mold parts while such parts are adjacent each other to form a casting cavity.

References Cited in the file of this patent

UNITED STATES PATENTS

| | | |
|---|---|---|
| 513,998 | Grant | Feb. 6, 1894 |
| 1,542,601 | Bornhauser et al. | June 16, 1925 |
| 2,636,231 | Dougherty | Apr. 28, 1953 |
| 2,700,804 | Hines | Feb. 1, 1955 |
| 2,871,527 | Wallwork | Feb. 3, 1959 |

FOREIGN PATENTS

| | | |
|---|---|---|
| 634,991 | Germany | Sept. 7, 1936 |
| 471,690 | Great Britain | Sept. 9, 1937 |